Feb. 5, 1952 C. E. CLAPPER 2,584,329
HOT-AIR DEFLECTOR FOR TRACTORS
Filed April 24, 1947 3 Sheets-Sheet 1
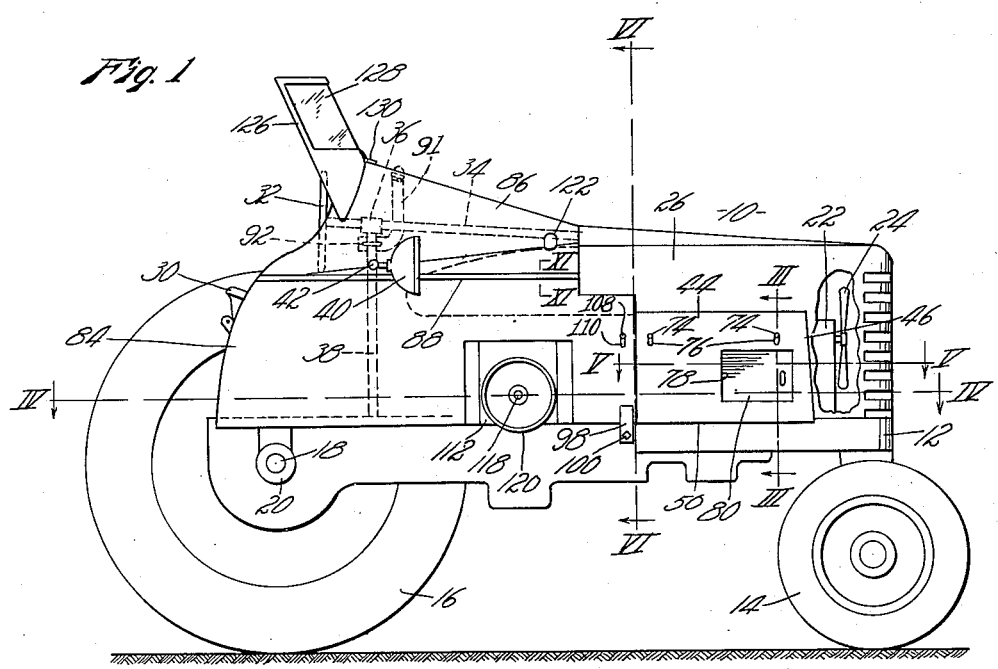
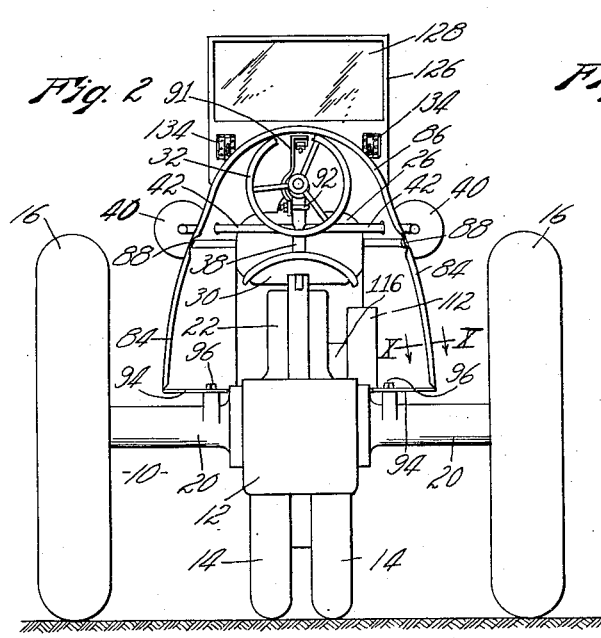
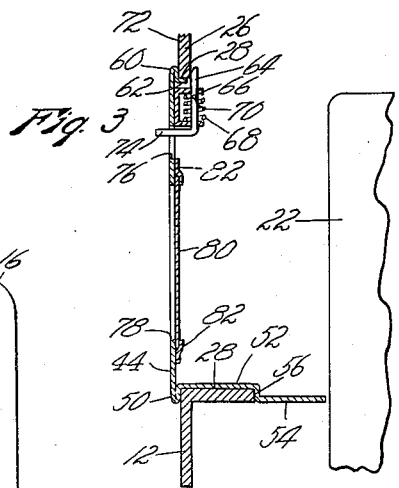
INVENTOR,
Clyde E. Clapper.
BY
Roy E. Hamilton
Attorney.

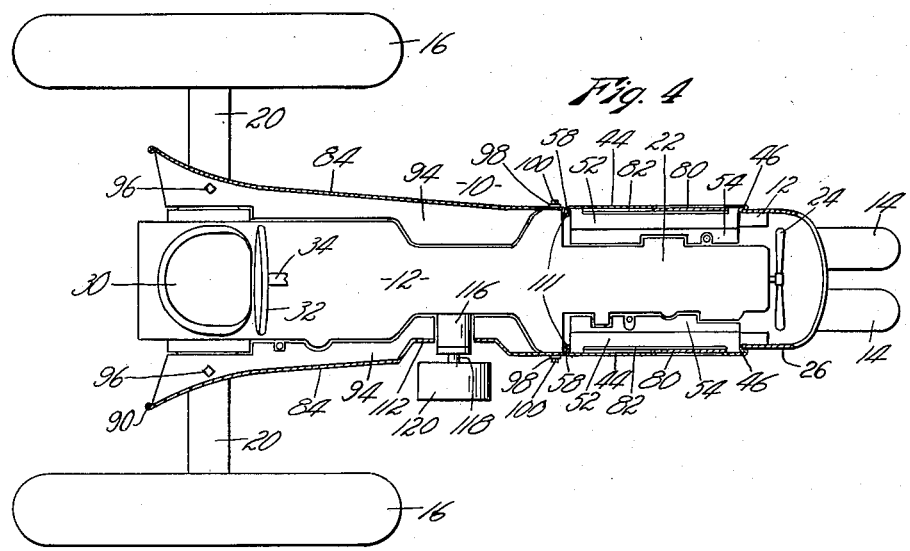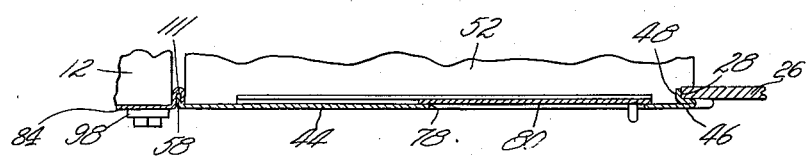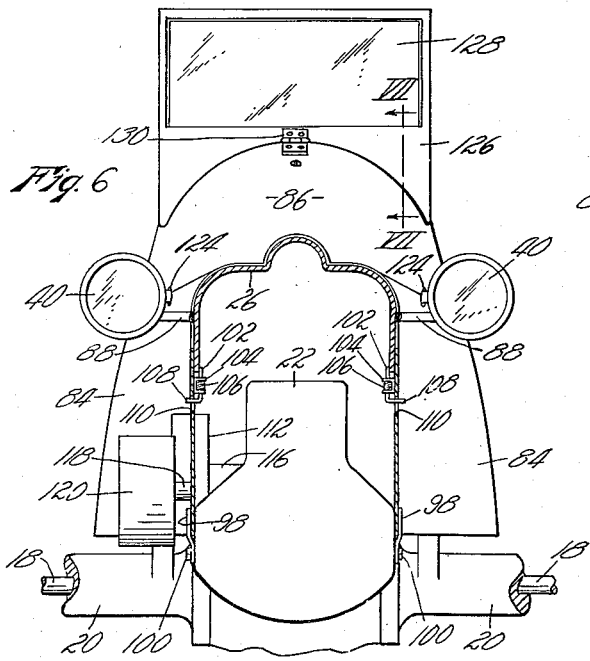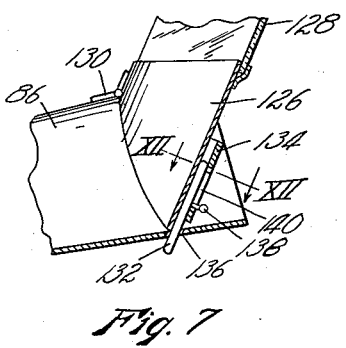

Feb. 5, 1952     C. E. CLAPPER     2,584,329
HOT-AIR DEFLECTOR FOR TRACTORS
Filed April 24, 1947     3 Sheets-Sheet 3
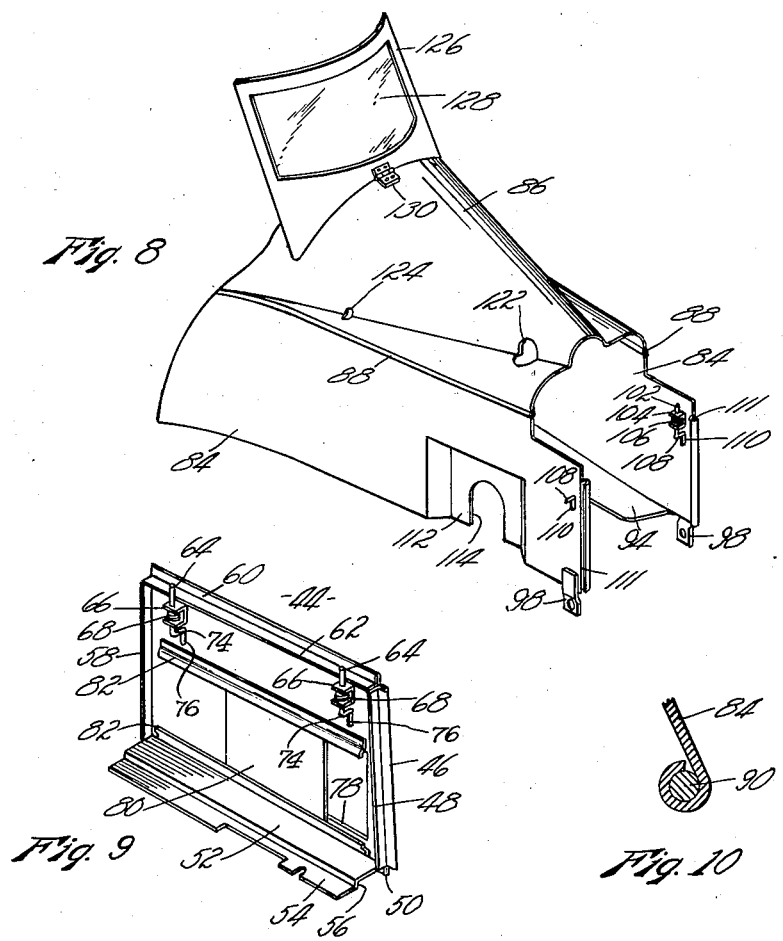
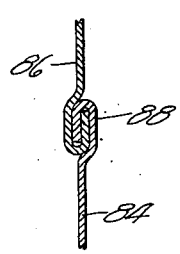
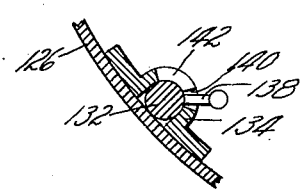
INVENTOR,
Clyde E. Clapper.
BY Roy E. Hamilton,
Attorney.

Patented Feb. 5, 1952

2,584,329

UNITED STATES PATENT OFFICE 2,584,329

HOT-AIR DEFLECTOR FOR TRACTORS

Clyde E. Clapper, Kansas City, Mo.

Application April 24, 1947, Serial No. 743,606

2 Claims. (Cl. 180—54)

This invention relates to hot air deflectors for tractors and has particular reference to a deflector suitable for use on the conventional type of farm tractor having an open frame, whereby the heat from the engine is normally dissipated from the sides thereof. It is an improvement over the device shown in Patent No. 2,452,834, issued November 2, 1948.

In cold weather the tractor operator is not normally benefited by the heat generated by the tractor engine due to the fact that it is dissipated outwardly from said engine before it reaches the operator when seated in the normal position on the tractor.

The principal object of the present invention is to provide readily detachable means whereby the heated air from the engine and its associated parts is deflected so as to envelop and warm the operator of the tractor.

Another object of this invention is the provision of a hot air deflector of the class described having means adjustable to regulate the flow of heated air from the engine to the operator.

Other objects are simplicity and economy of construction, ease and rapidity of mounting, and adaptability for use on the various conventional types of farm tractors.

With these objects in view, as well as other objects which will appear during the course of the specification, reference will now be had to the drawings, wherein:

Figure 1 is a side elevation of a conventional type of farm tractor showing a hot air deflector embodying the present invention attached thereto, with parts broken away.

Fig. 2 is a rear elevation of the tractor and hot air deflector shown in Figure 1.

Fig. 3 is an enlarged fragmentary vertical section taken on line III—III of Figure 1, showing the means for attaching one of the forward deflector panels to the tractor.

Fig. 4 is a horizontal section taken on line IV—IV of Figure 1, with parts left in elevation.

Fig. 5 is an enlarged fragmentary horizontal section taken on line V—V of Figure 1.

Fig. 6 is an enlarged fragmentary vertical section taken on line VI—VI of Figure 1.

Fig. 7 is an enlarged fragmentary vertical section taken on line VII—VII of Figure 6, showing one of the latch rods for the hinged windshield portion.

Fig. 8 is a perspective view of the rear deflector hood, shown detached from a tractor.

Fig. 9 is an enlarged perspective view of the inner side of one of the forward deflector panels, shown separate from the tractor.

Fig. 10 is an enlarged fragmentary section taken on line X—X of Figure 2.

Fig. 11 is an enlarged fragmentary section taken on line XI—XI of Figure 1.

Fig. 12 is an enlarged fragmentary section taken on line XII—XII of Figure 7.

Throughout the several views like reference characters refer to similar parts and the numeral 10 designates a farm tractor of the conventional type having a frame 12 mounted on front wheels 14 and rear wheels 16, said rear wheels being mounted on axles 18 adjustably mounted in axle housings 20. Frame 12 carries an engine 22 which powers the tractor and drives an air circulating fan 24 which draws air through the radiator and forces it rearwardly over the engine. Frame 12 also carries a superstructure or frame 26 spaced above engine 22, thus providing openings 28 between frame 12 and superstructure 26 through which the heat from said engine is normally dissipated. A seat 30 carried by frame 12, is disposed at the rear central portion of the tractor so that the operator has proper position relative to the control levers and the steering wheel 32 mounted on the steering rod 34. Said steering rod is rotatably supported adjacent said steering wheel by a bearing 36 carried at the upper end of a standard 38 mounted rigidly on frame 12. Lamps 40 may be mounted on the outwardly extended ends of transverse supporting arms 42, said supporting arms being rigidly fixed at their inner ends to standard 38 adjacent its upper end.

All of the tractor parts just described are conventional and it is not the purpose of the inventor to disclose any special tractor, but to include any of the conventional types of tractors of this general form.

It is the primary purpose of this invention to so control the air flow created by the fan 24 or the natural flow of hot air from the engine in the direction of the operator whereby he is warmed by the heat developed by the internal combustion engine.

Front deflector panels 44 are adapted to close openings 28 between superstructure 26 and frame 12, at each side of engine 22, and extend rearwardly from the forward ends of said open spaces to the rearward end of said engine. As clearly shown in Figures 3 and 5, the forward edge of each of said panels is bent to form a flange 46 adapted to abut against superstructure 26 adjacent opening 28, and an inwardly extending flange 48 projecting into said opening, thus preventing forward movement of the panel.

The lower edge of each panel 44 is bent to form a flange 50 adapted to abut against the outer surface of frame 12 adjacent opening 28, and an inwardly extending flange 52 projecting through said opening. Said last named flange is provided with a downwardly offset longitudinal portion 54 forming a shoulder 56 adapted to engage the inner edge of frame 12 and to retain the lower edge of panel 44 in place, as clearly shown in Figure 3. The inner edge of flange 52 extends almost to engine 22, being shaped to conform closely to the contour of said engine, as shown in Figure 4, thus preventing the escape of heated air downwardly between frame 12 and engine 22.

The rearward edge of panel 44 is bent to form an inwardly extending flange 58 adapted to engage the rear deflector hood as hereinafter described. The upper edge of each panel 44 is bent to form a flange 60 adapted to abut against the outer surface of superstructure 26 adjacent opening 28, and an inwardly extending flange 62 extending into said opening. The upper edges of panels 44 are held in place by a plurality of latch bars 64, each of said bars being vertically slidable in a bracket 66 fixed to the inner surfaces of said panels adjacent the upper edges thereof, as best shown in Figure 3. Said bar is urged upwardly by a spring 68 carried on said bar and compressed between pin 70 carried in said bar and said bracket. Said bar when in its upward position is adapted to engage the inner surface of depending side wall 72 of superstructure 26. Latch bar 64 is bent at its lower end to form an operating handle 74 extending outwardly through a slot 76 in panel 44. Thus, said panels may be removed from the tractor by depressing handles 74 to disengage latch bars 64 from the superstructure and tilting the upper edges of said panels outwardly from the tractor. The panels may then be lifted out, disengaging shoulder 56 and flange 60, at the lower edges of the panels, from frame 12.

Each panel 44 has an opening 78 formed therethrough, said opening being equipped with a door 80 adapted to be slidably moved in slide members 82 fixed to the inner surface of panels 44, thus adjusting the size of opening 78. Superstructure 26 is, of course, closed and prevents the upward escape of heated air.

The rear deflector hood comprises two side panels 84 and a cowl 86, said cowl extending over the top of the tractor and being connected at its edges to the upper edges of the side panels by means of rolled seams 88, as shown in Figure 11. Said cowl is shaped at its forward end to conform closely to the shape of superstructure 26, and is taperingly enlarged rearwardly to a point substantially even with steering wheel 32. Side panels 84 extend behind seat 30, and are flared outwardly adjacent said seat to permit the driver ample space in which to mount and dismount from said seat. The rearward edges of side panels 84 and cowl 86 have rods 90 rolled therein as shown in Figure 10 to impart rigidity to the deflector hood. A brace 91 is rigidly connected at its lower end to standard 38 by means of U-bolt 92, and at its upper end to the inner surface of cowl 86. Side panels 84 are bent at their lower edges to present inwardly projecting flanges 94 shaped to conform closely to the contour of the tractor frame 12. Said flanges are removably fixed to axle housings 20 by any suitable means such as screws 96, as shown in Fig. 4.

A short strap member 98 is welded or otherwise fixed to the outer surface of each of side panels 84 at the lower front corner thereof, and extends downwardly beneath said side panels. The extended portions of said straps are adapted to be removably fixed to frame 12 by any suitable means such as screws 100. Said side panels are equipped at their upper front corners with latch bars 102 similar in function to latch bars 64 of front deflector panels 44, having brackets 104, springs 106, and handles 108 extending outwardly through slots 110 in side panels 84. Said latch bars serve to removably attach the upper front corners of the side panels to superstructure 26. The forward edges of side panels 84 are bent to present outwardly opening grooves 111 adapted to receive flanges 58 formed at the rearward edges of front deflector panels 44, thus forming a substantially air tight connection between said panels, as shown in Fig. 5.

Right side panel 84 is provided with an inwardly offset portion 112 having a slot 114 formed therein to fit around shaft housing 116 extending outwardly from tractor frame 12. Said housing carries a power take-off shaft 118 on the outer end of which is mounted a pulley 120. Said power take-off shaft and pulley is standard equipment on many tractors, and the purpose of their disclosure here is to illustrate the facility with which the deflector of this invention may be modified to fit various different types of tractors.

Cowl 86 is provided with a hole 122 through which the gasoline tank, not shown, carried in superstructure 26 may be filled, and with holes 124 through which supporting arms 42 of lamps 40 may extend. Said lamps must be removed from their supporting arms while cowl 86 is being installed, and replaced when the cowl is in position.

An arcuate windshield frame 126 carrying an arcuate windshield 128, is hingeably fixed to the upper surface of cowl 86 adjacent its rearward edge by means of hinge 130. The windshield may thus be pivoted forwardly to lie along cowl 86 when the operator does not need a windshield, or when it is desired to drive the tractor through a low door or the like. Normally, windshield frame 126 slopes upwardly and rearwardly from the cowl, and the lower edge of the windshield frame is shaped to conform closely to the contour of the cowl.

The windshield may be secured in its raised position by locking bolts 132 carried on the rearward surface of windshield frame 126 adjacent the lower edge thereof. Said bolts are vertically slidable in brackets 134 fixed to frame 126, and are adapted to be extended into holes 136 provided therefor in cowl 86. Since frame 126 moves substantially tangentially to the cowl at this point, the extension of bolts 132 into said holes effectively secures the frame 126 against any movement. Bolts 132 may be operated by handles 138 fixed thereto and extending outwardly through slots 140 formed longitudinally in brackets 134. Bolts 132 may be fixed in either the extended or retracted position by rotating the bolts to move handles 138 into offset portions 142 of slots 140.

Referring to Figures 4 and 6, it will be seen from the foregoing description that the hot air deflector, in combination with the tractor structure, produces a passageway for the air heated by the engine, whereby said air is conducted from the engine to the space occupied by the driver. The forward part of said passageway is enclosed by superstructure 26, front deflector panels 44, flanges 52, and engine 22. The rearward part of said passageway is formed by cowl 86, side panels 84, flanges 94, and tractor frame 12. The tractor frame is closed at the rearward part in most tractors by the transmission, differential, floor, etc., to prevent downward escape of the heated air.

The air delivered by the deflector to the driver may be tempered by slidably opening doors 80 in front deflector panels 44, as shown in Figure 9. This permits dissipation of engine heat through the door, and also the entry of air not heated by passage through the radiator. When desired, still greater reduction of temperature may be obtained by removing the front deflector panels completely. The entire deflector assembly may be mounted on or removed from the tractor rapidly and easily. It is quite apparent that many minor changes of structure and arrangement of parts could be made to adapt the deflector to fit other tractors, without departing from the spirit of the present invention.

What I claim as new and desire to protect by Letters Patent is:

1. The combination with a tractor having a conventional open-sided frame carrying an engine, a ventilating fan driven by said engine, and a seat structure carried by said frame at the rear of said engine, of two deflector panels adapted to be removably attached to said frame to close the sides thereof adjacent said engine to form a passageway about said engine, said deflector panels having inwardly extending flanges formed along the lower edges, said flanges conforming closely to the contour of said engine to form a floor for said passageway, and a deflector hood carried by said frame, the open rearward end of said hood being disposed adjacent said seat structure and the forward end of said hood interlocking with said first named deflector panels to form a continuation of said passageway, said hood having inwardly extending flanges along its lower edges conforming closely to the contour of said tractor frame to form a floor for said passageway continuation, said deflector panels and hood forming in conjunction with said tractor a continuous passageway extending from the front to the rear of the tractor through which air heated by said engine is forced by said fan to the zone of said seat structure.

2. The combination with a conventional tractor, including an open frame carrying an engine provided with a ventilating fan, a seat structure carried by said frame to the rear of said engine, and a frame superstructure positioned in spaced relation above said engine and in front of said seat, of a deflector hood having an open rearward end, said end being attached to said frame adjacent said seat structure and a forward end of said hood being attached to said frame and to the rearward end of said frame superstructure, and two deflector panels adapted to be attached to said frame to close the space between said frame and said frame superstructure, said panels being interlocked with said deflector hood to form in conjunction therewith and with said frame a continuous tunnel extending from the front to the rear of said tractor through which air heated by said engine is conducted to the zone of said seat structure, said deflector hood and panels having inwardly turned flanges along their lower edges, said flanges conforming closely to the contour of said engine and said frame to form a floor for said tunnel.

CLYDE E. CLAPPER.

REFERENCES CITED

The following references are of record in the file of this patent:

UNITED STATES PATENTS

| Number | Name | Date |
| --- | --- | --- |
| 1,510,608 | Ransom | Oct. 7, 1924 |
| 1,634,828 | Gordon | July 5, 1927 |
| 1,771,679 | Holt | July 29, 1930 |
| 2,267,227 | Williams | Dec. 23, 1941 |
| 2,423,748 | Acheson | July 8, 1947 |
| 2,451,553 | Hedquist et al. | Oct. 19, 1948 |
| 2,452,834 | Clapper | Nov. 2, 1948 |
| 2,461,974 | Flora | Feb. 15, 1949 |

OTHER REFERENCES

"Ford Field," February 1946, page 45, advertisement appearing thereon.